US006619872B2

(12) United States Patent  (10) Patent No.: US 6,619,872 B2
Crorey et al.                (45) Date of Patent:     Sep. 16, 2003

(54) MODULAR TOOLING COUPLING APPARATUS (75) Inventors: David J. Crorey, Clinton Township; Jeffery Dellach, Macomb; John D. Walton, Jr., Grosse Pointe, all of MI (US)

(73) Assignee: Norgren Automotive, Inc., Clinton Township, MI (US)

( * ) Notice: Subject to any disclaimer, the term of this patent is extended or adjusted under 35 U.S.C. 154(b) by 118 days.

(21) Appl. No.: 09/736,862

(22) Filed: Dec. 13, 2000

(65) Prior Publication Data

US 2001/0004431 A1 Jun. 21, 2001

Related U.S. Application Data (63) Continuation-in-part of application No. 09/458,519, filed on Dec. 13, 1999.
(60) Provisional application No. 60/195,086, filed on Apr. 6, 2000.

(51) Int. Cl.[7] .................................................. E04G 3/00
(52) U.S. Cl. ............................ 403/97; 403/84; 403/71; 403/54; 403/354.1
(58) Field of Search ............................ 403/97, 54, 84, 403/171, 91, 83, 98, 99, 101, 359.1; 248/292.12

(56) References Cited

U.S. PATENT DOCUMENTS

| 3,205,522 | A |   | 9/1965  | Then          |          |
|-----------|---|---|---------|---------------|----------|
| 3,799,599 | A |   | 3/1974  | Jordan        |          |
| 3,922,481 | A |   | 11/1975 | Lewis         |          |
| 4,447,170 | A |   | 5/1984  | Holmes        |          |
| 4,474,328 | A |   | 10/1984 | Hale          |          |
| 4,547,092 | A |   | 10/1985 | Vetter et al. |          |
| 4,875,651 | A |   | 10/1989 | Wergin et al. |          |
| 4,986,016 | A |   | 1/1991  | Wichman       |          |
| 5,520,474 | A |   | 5/1996  | Liu           |          |
| 5,538,215 | A |   | 7/1996  | Hosey         |          |
| 5,547,305 | A |   | 8/1996  | Treche        |          |
| 5,564,852 | A |   | 10/1996 | Maxwell et al.|          |
| 5,694,818 | A | * | 12/1997 | Nickipuck     | 403/97 X |
| 6,079,682 | A |   | 6/2000  | Olkkola       |          |
| 6,095,713 | A | * | 8/2000  | Doyle et al.  | 403/97   |
| 6,106,181 | A | * | 8/2000  | Neuhof        | 403/97 X |

FOREIGN PATENT DOCUMENTS

GB       2042056       9/1980

* cited by examiner

*Primary Examiner*—Lynne H. Browne
*Assistant Examiner*—John R. Cottingham
(74) *Attorney, Agent, or Firm*—Young & Basile, P.C.

(57) ABSTRACT

A coupling apparatus for adjustably mounting modular tooling members having a base member releasably connectable to a slide mount wherein said base member is adjustably located along a predetermined path of travel defined by the slide mount. The base member is rotatably adjustable with respect to a midportion via a pair of matingly engaging contoured surfaces. In a preferred embodiment, the midportion may also be rotatably adjustable with respect to an end member along a second rotational axis. The midportion and the end member may be adjustably rotated through a pair of contoured surfaces substantially similar to that provided between the midportion and the base member. The end member provides an aperture for releasably connecting a boom rod to the end member. In an alternative embodiment, the midportion is integrally connected to the end member wherein the end member provides an aperture for matingly engaging a first spline rod. The first spline rod may be rotatably adjusted about a second rotational axis. A spline bracket may be adjustably connected to the opposite end of the first spline rod while also engaging one end of a second spline rod. The spline bracket provides rotational adjustment of the two spline rods wherein the axes of the spline rods are substantially perpendicular and axially spaced from one another. A workpiece mounting bracket having a base member, midportion, and end member, may then be used to matingly engage and adjustably connect the second spline rod to a workpiece handling device.

22 Claims, 5 Drawing Sheets

MODULAR TOOLING COUPLING APPARATUS

The following patent application is a formalization of U.S. Provisional Patent Application Ser. No. 60/195,086, which was filed on Apr. 6, 2000 and is also a continuation-in-part of U.S. Patent Application Ser. No. 09/458,519 which was filed on Dec. 13, 1999.

FIELD OF THE INVENTION

The present invention relates to a coupling apparatus for adjustably mounting modular tooling members, and in particular, a coupling apparatus that provides multi-axial adjustment of modular tooling members through adjustable engagements of adjoining members.

BACKGROUND OF THE INVENTION

With the advent of mechanical manipulators and robotic arms, various tooling assemblies and workpiece handling devices have been designed to quickly connect and disconnect to mechanical manipulators and robotic arms so that a variety of modular tooling assemblies can be utilized with the same manipulator. Flexibility and adjustability are preferably designed into the tooling assemblies so that the tooling assemblies can be configured for a variety of workpiece configurations. Previous tooling assemblies have utilized various sections of tubing interconnected by various brackets and mounts for fixturing a variety of workpieces, but such designs are typically rigid and provide little or no adjustment in the tooling assembly. Other designs have utilized extrusions or slide mounts to allow the sections of tubing to be adjusted along a linear path of travel, but such designs have a limited amount of flexibility in that they provide only one degree or axis of adjustment.

Other known designs have utilized ball mounts to provide rotational or orbital adjustment of the tubing. Such ball mounts typically provide a bracket that receives and clamps a spherical ball through the use of a conventional fastener. Due to the configuration of the clamps, such ball mounts typically do not provide 360° rotational movement. In addition, these designs are susceptible to slipping, especially when such tooling mounts are exposed to various grease and oils, as well as random forces, that are common in an industrial environment. If the ball mount slips, the workpiece handling boom may become misaligned with respect to the workpiece thereby causing the work station to be shut down and readjusted. These shutdowns create inefficiencies that are undesirable in an industrial environment.

Thus, it is desirable to produce a coupling apparatus for adjustably mounting modular tooling members that provides multi-axial adjustment without the risk of slipping and misaligning.

SUMMARY OF THE INVENTION

The present invention provides a coupling apparatus for adjustably mounting modular tooling members. The coupling apparatus provides a base member releasably connectable to a slide mount wherein the base member is adjustably located along a predetermined path of travel. The base member provides a first contoured surface that matingly engages a second contoured surface of a midportion of the coupling apparatus for rotatably adjusting the midportion with respect to the base member about a first axis. In the preferred embodiment, the midportion also provides a third contoured surface that matingly engages a fourth contoured surface of an end member of the coupling apparatus. The end member is adjustably connected to the midportion for rotatably adjusting the end member about a second axis. The end member is releasably connectable to a tooling rod.

In the preferred embodiment, the base member, midportion, and end member are situated such that the first axis is substantially perpendicular to the second axis. The path of travel in which the base member moves along the slide mount is substantially linear and substantially perpendicular to the first axis.

Each of the contoured surfaces of the base member, midportion and end member are substantially similar in that they each provide a substantially circular surface having V-shaped teeth extending radially outward from the first and second axis.

In another embodiment, the base member similarly provides a first contoured surface that matingly engages a second contoured surface of a midportion to allow for rotational adjustment of the midportion relative to the base member about a first axis. An end member is integrally connected to the midportion and provides a third contoured surface that matingly engages and is adjustably connected to a first spline rod for rotatably adjusting the first spline rod about a second axis.

The coupling apparatus may be expanded by connecting a spline bracket to a second end of the first spline rod wherein the first end of the first spline rod is connected to the end member. The spline bracket is adjustably connected to the first spline rod for rotatably adjusting the spline bracket relative to the first spline rod about the second axis. The spline bracket is also adjustably connected to a second spline rod for rotatably adjusting the second spline rod about a third axis. The second spline rod may also have a first end and a second end wherein the first end is adjustably connected to the spline bracket and the second end is adjustably connected to a workpiece mounting bracket for rotational adjustment of the second spline rod about the third axis. The workpiece mounting bracket is connectable to a workpiece handling device.

The coupling apparatus may also provide position indicators which include indicia formed on the midportion and the end member to indicate at least one of the relative positions of the first spline rod relative to the end member and of the midportion relative to the base member. In addition, similar indicia may be utilized on the spline brackets to indicate the position of the spline rods relative to the spline brackets.

BRIEF DESCRIPTION OF THE DRAWINGS

The various other uses of the present invention will become more apparent by referring to the following detailed descriptions and drawings in which.

DETAILED DESCRIPTION OF THE PREFERRED EMBODIMENT

Figure 1:
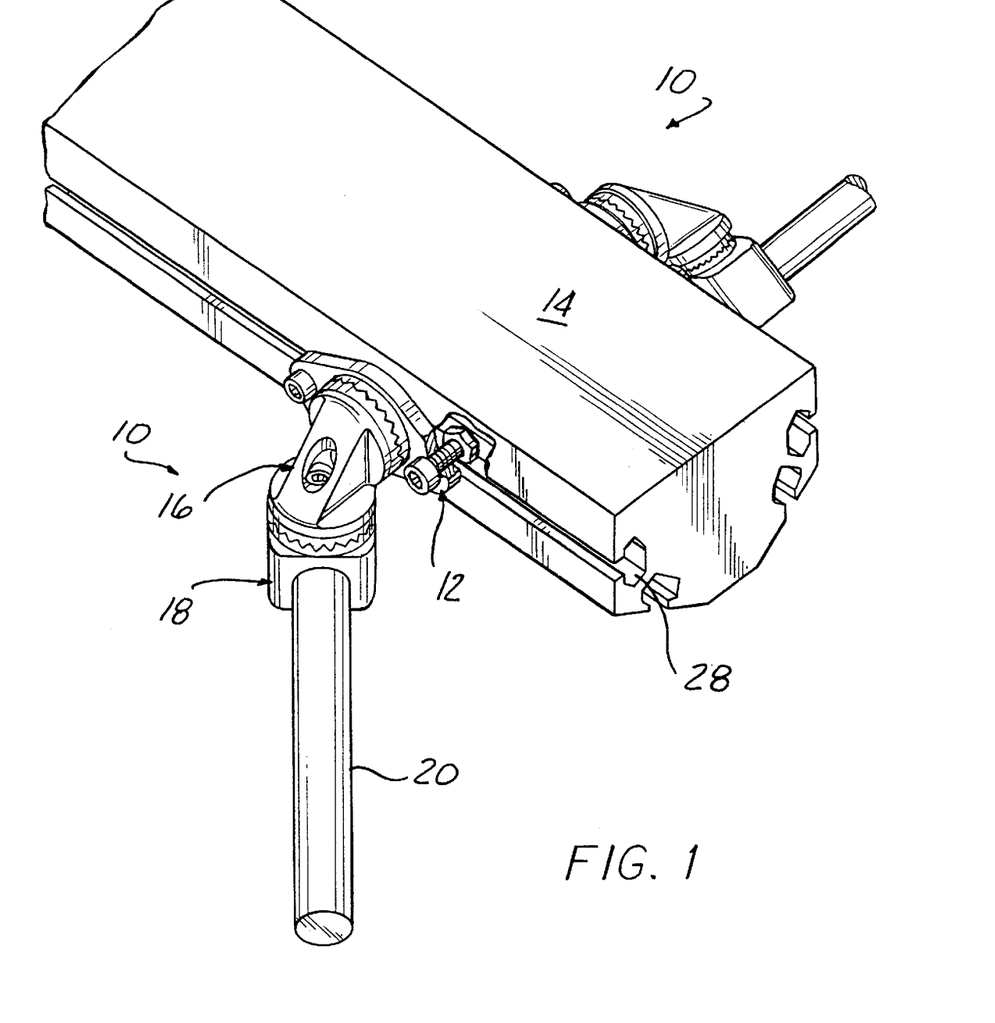
FIG. 1 is a perspective view showing the coupling apparatus attached to a slide mount.

FIG. 1 is a coupling apparatus 10 of the present invention. The coupling apparatus 10 has a base member 12 that is releasably connectable to a slide mount 14 for adjustably locating the coupling apparatus 10 along a predetermined path of travel. The base member 12 is adjustably connected to a midportion 16 of the coupling apparatus 10, and the midportion 16 is adjustably connected to an end member 18 of the coupling apparatus 10. All three members 12, 16, 18 of the coupling apparatus 10 are preferably fabricated from cast aluminum to create a light weight, strong part that does not require machining. The present invention is not limited to cast aluminum, but rather, the coupling apparatus 10 may be fabricated from any material having the strength necessary to support the tooling assemblies and workpieces utilized in conjunction with the coupling apparatus 10. The end member 18 is releasably connectable to a tooling rod, such as a boom rod 20 or a spline rod 84, that is typically utilized for carrying workpiece handling fixtures such as vacuum cups, clamps (not shown) and/or grippers 106.

Figure 2:
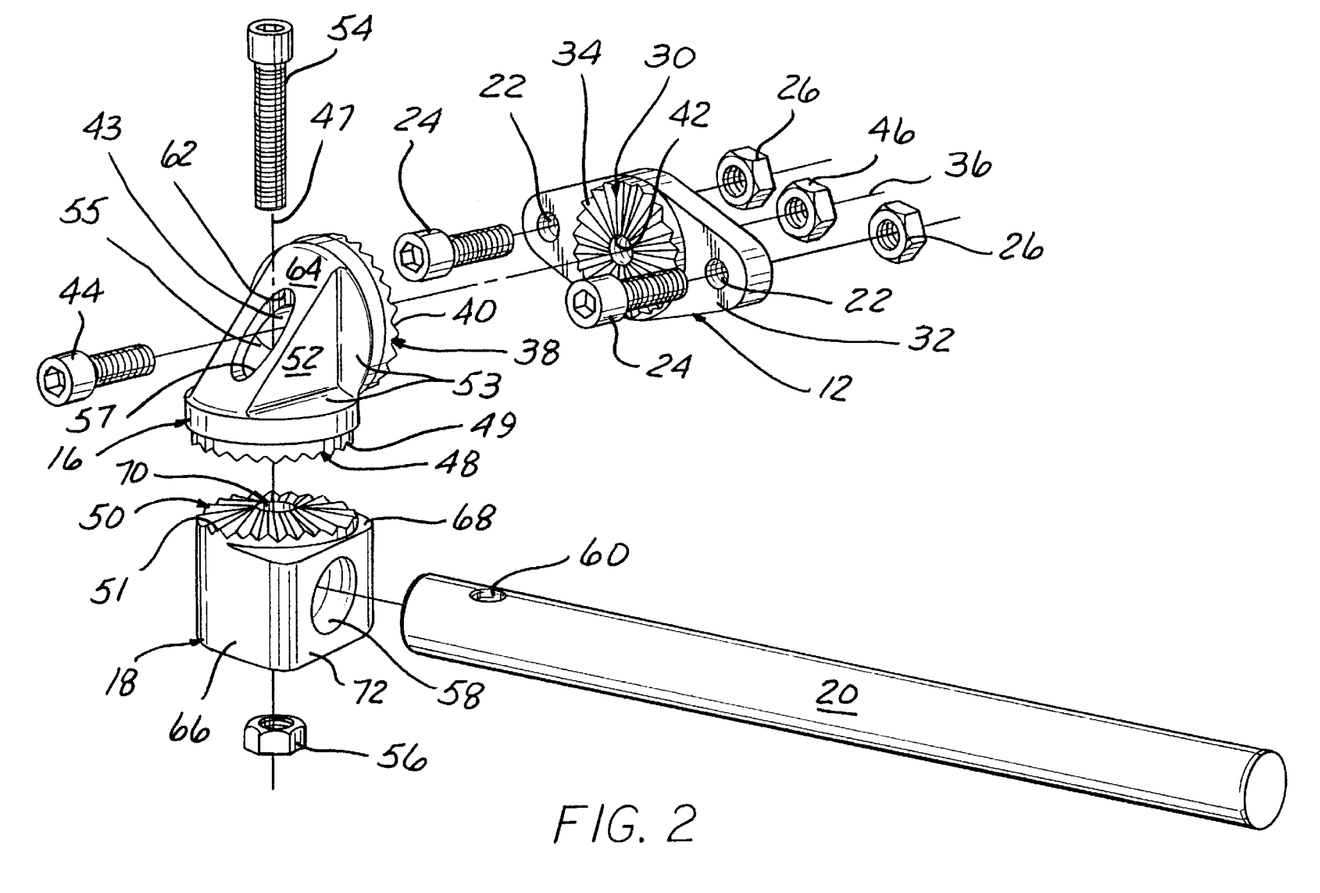
FIG. 2 is an exploded view of the coupling apparatus of the present invention.

To adjustably locate the coupling apparatus 10 along the slide mount 14, the base member 12 has a substantially diamond shape configuration, as seen in FIGS. 1 and 2. An aperture 22 is provided at each end of the base member 12, and the apertures 22 receive threaded fasteners 24 that each threadingly engage a nut 26 on the opposite side of the base member 12. The nuts 26 are received and captured within a slot 28 provided in the slide mount 14. The slot 28 has a substantially C-shaped configuration so that the nuts 26 remain captured within the slot 28 while providing the fasteners 24 access to the nuts 26 through the opening in the C-shaped slot 28. The C-shaped slot 28 extends substantially linearly along the slide mount 14.

To provide rotational adjustment of the midportion 16 with respect to the base member 12, the base member 12 provides a first contoured surface 30 on the front side 32 of the base member 12. The contoured surface 30 is substantially circular and slightly raised from the front side 32 of the base member 12. The contoured surface 30 has V-shaped teeth 34 formed therein which extend radially outward from a first axis 36 of the contoured surface 30. The V-shaped teeth 34 are circumferentially adjacent one another so that as the V-shaped teeth 34 extend radially outward, the teeth 34 become wider to form a substantially concentric and uniform surface.

The midportion 16 provides a second contoured surface 38 that matingly engages the contoured surface 30 of the base member 12. The contoured surface 38 of the midportion 16 is substantially similar to the contoured surface 30 of the base member 12 in that the contoured surface 38 of the midportion 16 has a substantially circular surface having V-shaped teeth 40 extending radially outward from the first axis 36. The contoured surfaces 30, 38 matingly engage by having the raised portions of the V-shaped teeth 34, 40 matingly engage valleys or lower portions of the V-shaped teeth 40, 34 of the opposing contoured surface 38, 30. Both the base member 12 and the midportion 16 provide apertures 42, 43, respectively, along the first axis 36 for receiving a fastener 44 that extends through midportion 16 and base member 12 and is threadingly received by a threaded nut 36 that is captured within the slot 28 of the slide mount 14. The fastener 44 and the nut 46 connect and secure the midportion 16 to the base member 12 by ensuring that the contoured surfaces 30, 38 maintain their engagement. This type of circular mating engagement without interference from neighboring parts allows for complete 360° orbital adjustment of the midportion 16 about the first axis 36 relative to the base member 12.

In order to provide a second degree of rotational adjustment of the coupling apparatus 10, the midportion 16 is also rotatably adjustable about a second axis 47 with respect to the end member 18 by having a third contoured surface 48 of the midportion 16 matingly engage a fourth contoured surface 50 of the end member 18. The contoured surfaces 48, 50 of the midportion 16 and the end member 18, respectively, are substantially similar to the contoured surfaces 30, 38 provided between the base member 12 and the midportion 16, respectively, in that the contoured surfaces 48, 50 both provide substantially V-shaped teeth 49, 51 that extend radially outward from the second axis 47. As similarly stated with regard to the base member 12 and the midportion 16, this type of circular mating engagement without interference from neighboring parts allows for complete 360° orbital adjustment of the midportion 16 about the second axis 47 with respect to the end member 18.

The second contoured surface 38 and the third contoured surface 48 of the midportion 16 are integrally formed at each end of the midportion 16 and are offset from one another at a substantially 90° angle. The backsides 53 of the contoured surfaces 38, 48 are connected and supported by a substantially triangular webbing or structural support 52 that is integral with and extends between the backsides 53 of the contoured surfaces 38, 48. The structural support 52 has an aperture or cavity 55 which extends along the first axis 36 and the second axis 47. In addition, the aperture or cavity 55 is in communication with the aperture 43 in contoured surface 38 of the midportion 16 and an aperture 57 in contoured surface 48 of the midportion 16. The aperture 55 extends outward from the structural support 52 at the intersection of the first and second axes 36, 47 to form a substantially oval shaped opening 62 on an outer surface 64 of the structural support 52. The substantially oval shaped opening 62 in the structural support 52 provides access to fasteners 44, 54 along the first and second axes 36, 47, respectively, and allows for the heads of the fasteners 44, 54 to be housed within the cavity 55 of the structural support 52. A threaded nut 56 threadingly receives the fastener 54 and connects and secures the midportion 16 to the end member 18 by maintaining engagement between the contoured surfaces 48, 50 of the midportion 16 and the end member 18.

To releasably connect the boom rod 20 to the end member 18, the end member 18 preferably has a substantially square body 66 having rounded corners with one of its sides being substantially arcuate. A top surface 68 of the end member 18 has the contoured surface 50 formed therein with an aperture 70 extending through the end member 18 along the second axis 47. A second aperture 58, substantially perpendicular to said second axis 47, is formed through a sidewall 72 of the end member 18 and is designed to receive an end of the boom rod 20. The boom rod 20 has an aperture 60 extending therethrough for receiving the fastener 54 that releasably connects the midportion 16 to the end member 18. The aperture 60 in the boom rod 20 receives the fastener 54 by having the centerline axis of the aperture 60 correspondingly align with the second axis 47.

In a separate embodiment, the coupling apparatus 10 may be expanded to provide further range and flexibility, as shown in FIGS. 3–9. The same base member 12 utilized in the preferred embodiment is adjustably connected to the slide mount 14 in the same manner described n the preferred embodiment. The base member 12 is adjustably connected to a midportion 73 and an end member 74 wherein the midportion 73 and the end member 74 are integrally connected. The end member 74 matingly engages and is adjustably connected to one end of the first spline rod 84. The opposite end of the spline rod 84 is connected to a spline bracket 86 which in turn is connected to a second spline rod 102. A workpiece mounting bracket 75, having components similar to base member 12, midportion 73, and end member 74, is utilized to connect a workpiece handling device or gripper 106 to the second spline rod 102.

Figure 3:
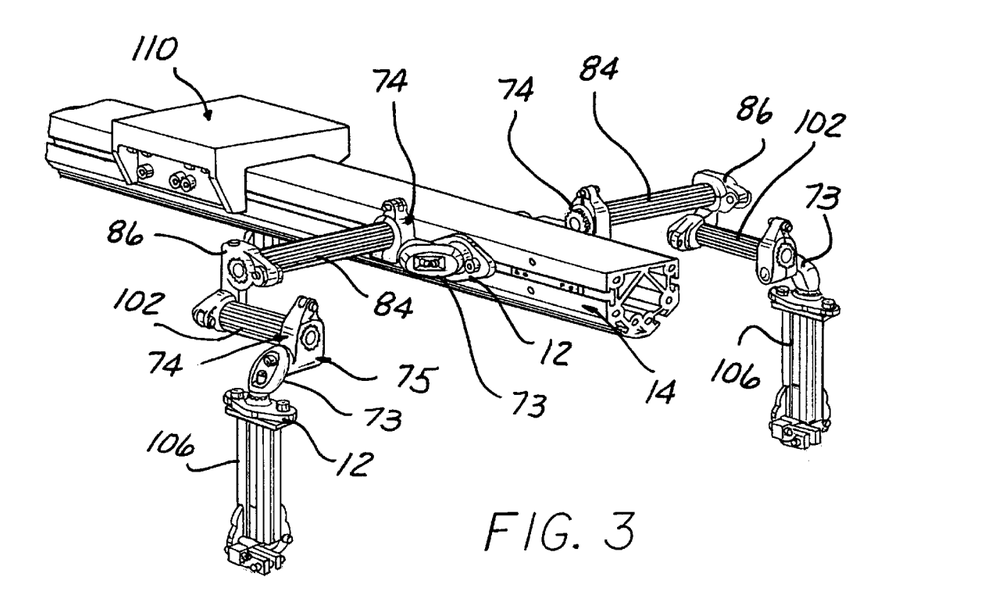
FIG. 3 is a perspective view showing the coupling apparatus of the present invention with spline rods, spline brackets, workpiece mounting brackets and workpiece handling devices.

In order to adjustably connect the midportion 73 to the base member 12, the midportion 73 is structurally similar to the midportion 16 described in the previous embodiment except that the midportion 73 is integrally connected to the end member 74 by a narrowing neck portion 81. The midportion 73 has a second contoured surface 77 that matingly engages the first contoured surface 38 of the base member 12. The first and second contoured surfaces 38, 77 are preferably in the form of V-shaped serrated teeth as described in the preferred embodiment. Fastener 44 releasably connects the first and second contoured surfaces 38, 77. The releasable connection allows for rotational adjustment of the midportion 73 relative to the base member 12 about a first rotational axis 79.

To integrally connect the second contoured surface 77 of the midportion 73 with the narrowing neck portion 81, the midportion 73 provides a type of elbow 69, similar to the structural support 52 described in the preferred embodiment. An aperture 71, similar to aperture 55 in the preferred embodiment, extends through the backside of the elbow 69 to provide access to apertures (not shown) that receive fastener 44 for connecting the midportion 73 and the base member 121 and receive fastener 54 for connecting the end member 74 to the first spline rod 84. The aperture 71 also provides a housing for the heads of fasteners 44, 54.

Figure 4:
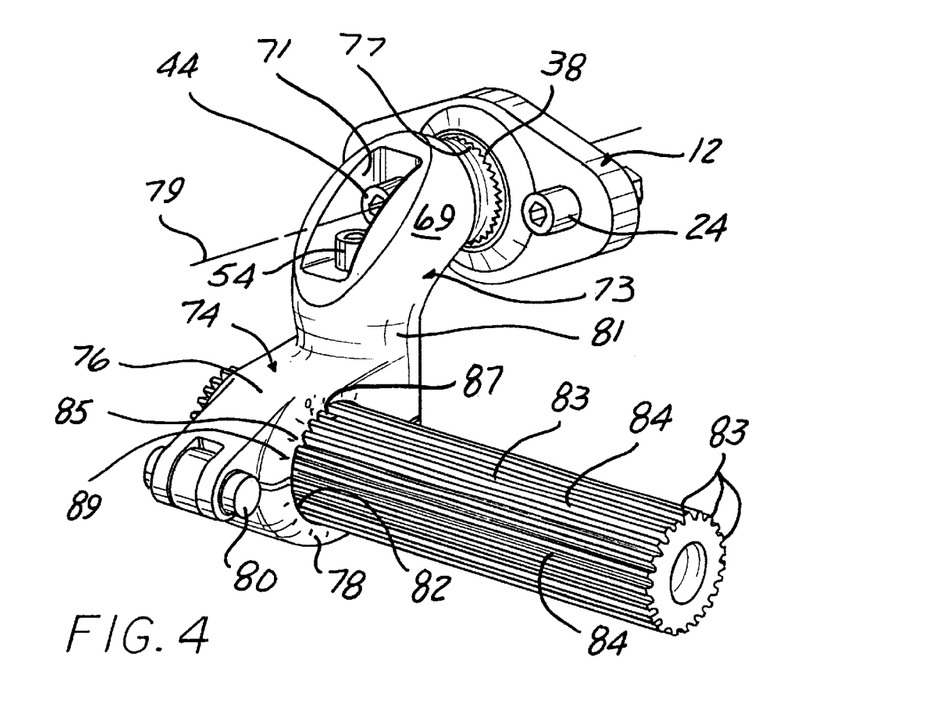
FIG. 4 is a perspective view of an end member and a spline rod of the present invention.
Figure 5:
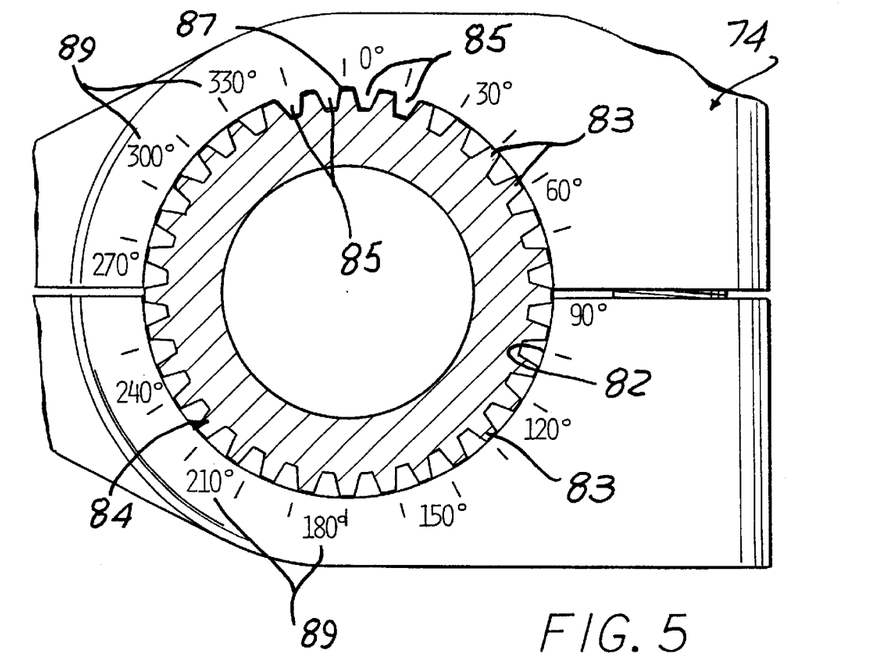
FIG. 5 is a sectional view showing the engagement of the end member and the spline rod of the present invention.

The end member 74 matingly engages and is adjustably connected to the first spline rod 84 by providing an upper portion 76 and a lower portion 78 wherein the upper and lower portions 76, 78 are separate structures that are hinged at one of their ends by a pivot pin 80, as seen in FIG. 4. The upper portion 76 of the end member 74 is integrally connected to the midportion 73 via narrowing neck portion 81, and fastener 54 extends through the midportion 73, neck portion 81, and upper and lower portions 76, 78 to connect the upper and lower portions 76, 78 opposite pivot pin 80. The end member 74 also provides an aperture 82 extending therethrough wherein both the upper portion 76 and the lower portion 78 of the end member 74 each define one-half of aperture 82. The upper portion 76 of the end member 74 provides a plurality of integral teeth 85, preferably four, that extend into aperture 82 to matingly engage splines 83 formed in the first spline rod 84, as seen in FIG. 5. The engagement of the teeth 85 with the splines 83 of the spline rod 84 prevent the spline rod 84 from rotating relative to its longitudinal axis or second rotational axis 95, as seen in FIG. 4. Fastener 54 maintains the relative position of the first spline rod 84 relative to the end member 74 by securing the upper and lower portions 76, 78 of the end member 74 against the first spline rod 84. To adjust the position of the first spline rod 84, the fastener 54 may be loosened to allow the upper and lower portions 76, 78 of the end member 74 to pivot outwardly away from spline rod 84. The spline rod 84 may then be rotatably adjusted about the second rotational axis 95 to a predetermined position wherein fastener 54 is then tightened to secure the spline rod 84 in the end member 74.

Unlike the preferred embodiment, the midportion 73 is integrally connected to the end member 74 by narrowing neck portion 81, and therefore, the midportion 73 cannot be adjusted relative to end member 74. The midportion 73 and the end member 74 may be fabricated so that the first and second rotational axes 79, 95 are substantially parallel, as seen in FIG. 3, or the midportion 73 and the end member 74 may be designed so that the first and second rotational axes 79, 95 are substantially perpendicular, as seen in FIG. 4. As provided in the preferred embodiment, the base member 12, midportion 73, and end member 74 are preferably fabricated from cast aluminum or some other high strength, lightweight material to provide a lightweight, strong part that does not require machining.

Figure 6:
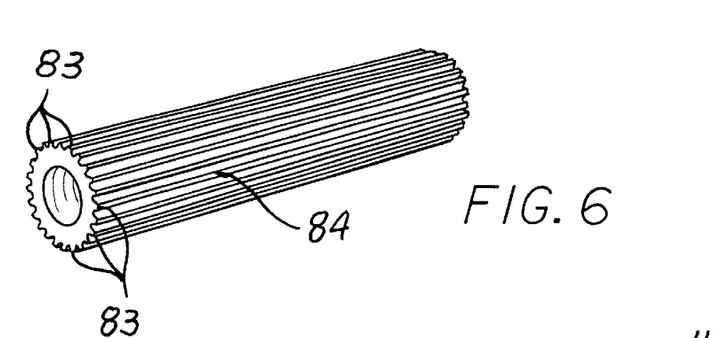
FIG. 6 is a perspective view of a spline rod of the present invention.

As seen in FIG. 6, the spline rod 84 comprises a hollow tubular configuration fabricated from an aluminum extrusion. The tubular extension and aluminum material provide for a lightweight, relatively inexpensive part. The tubular spline rod 84 has a plurality of splines 83 extending radially outward from the longitudinal axis of the spline rod 84. The splines 83 are preferably spaced at 15 degree increments to provide 15 degree radial incremental rotational adjustment of the spline rod 84. As seen in FIGS. 4–5, the spline rod 84 provides a mark 87 on one of its splines 83 to indicate where the spline rod 84 is mounted relative to the end member 74. The end member 74 provides a plurality of indicia 89 formed on the face of the end member 74 adjacent the aperture 82 wherein the indicia 89 provide reference calibrations incrementally spaced every 15 degrees. The position of the marked spline 87 relative to the indicia 89 on the end member 74 may be recorded so that after adjusting other portions of the coupling apparatus 10, the user can return the coupling apparatus 10 to its previous position.

Figure 7:
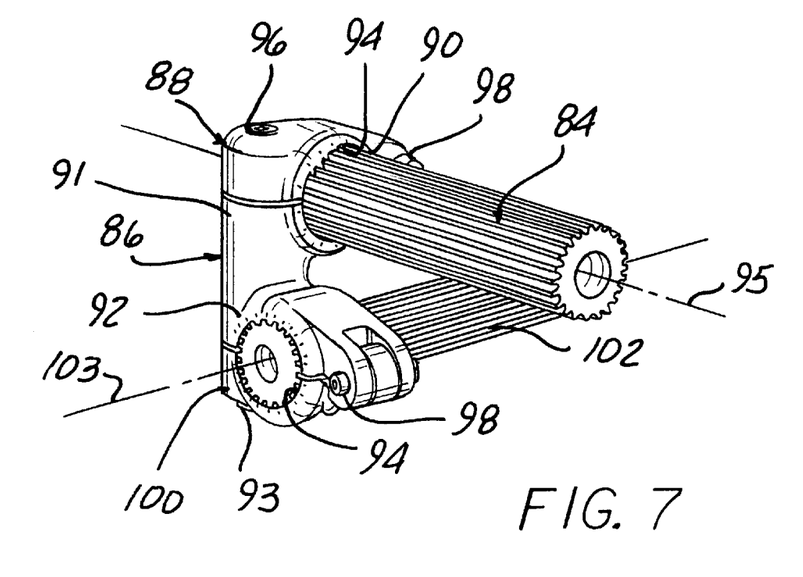
FIG. 7 is a perspective view of a spline bracket and spline rods of the present invention.

The spline bracket 86 may be utilized to increase the flexibility and the range of the coupling apparatus 10, as seen in FIGS. 3 and 7. The spline bracket 86 is similar to a pair of end members 74 that are integrally connected and axially spaced. The spline bracket 86 provides a first portion 88 and a second portion 100 each having an upper and lower section 90, 91, 92, 93, respectively. Each upper and lower section 90–93 of the first and second portions 88, 100 are pivotally connected by a pivot pin 98. The upper and lower sections 90–93 each define an aperture 94 for matingly engaging and adjustably connecting the opposite end or second end of the first spline rod 84 and a first end of the second spline rod 102, respectively, wherein the second spline rod 102 is substantially identical to the first spline rod 88. Both upper sections 90, 92 of the first and second portions 88, 100 provide integral teeth 85, preferably four teeth, which extend into their respective apertures 94 for engaging the first and second spline rods 84, 102. The lower section 91 of the first portion 88 and the upper section 92 of the second portion 100 of the spline bracket 86 are integrally connected by a tubular section 101. A single fastener 96 extends the length of the spline bracket 86 by passing through the upper and lower sections 90–93 of the first and second portions 88, 100 opposite the pivot pins 98 to adjustably connect the spline rods 84, 102 to the spline bracket 86. By loosening fastener 96, the upper and lower sections 90–93 of the first and second portions 88, 100 of spline bracket 86 may be pivoted away from the first and second spline rods 84, 102 to allow the spline rods 84, 102 to be rotatably adjusted about the second axis 95 and a third axis 103, respectively. The first and second portions 88, 100 of the spline bracket 86 are rotated substantially 90° relative to one another so that the second and third axes 95, 103 are substantially perpendicular to one another. The portions of the spline bracket 86 that are adjacent the apertures 94 may include indicia 89 that are similarly provided on end member 74. A marked spline 87 is utilized to record the position of the spline rods 84, 102 relative to the first and second portions 88, 100 of the spline bracket 86.

Figure 8:
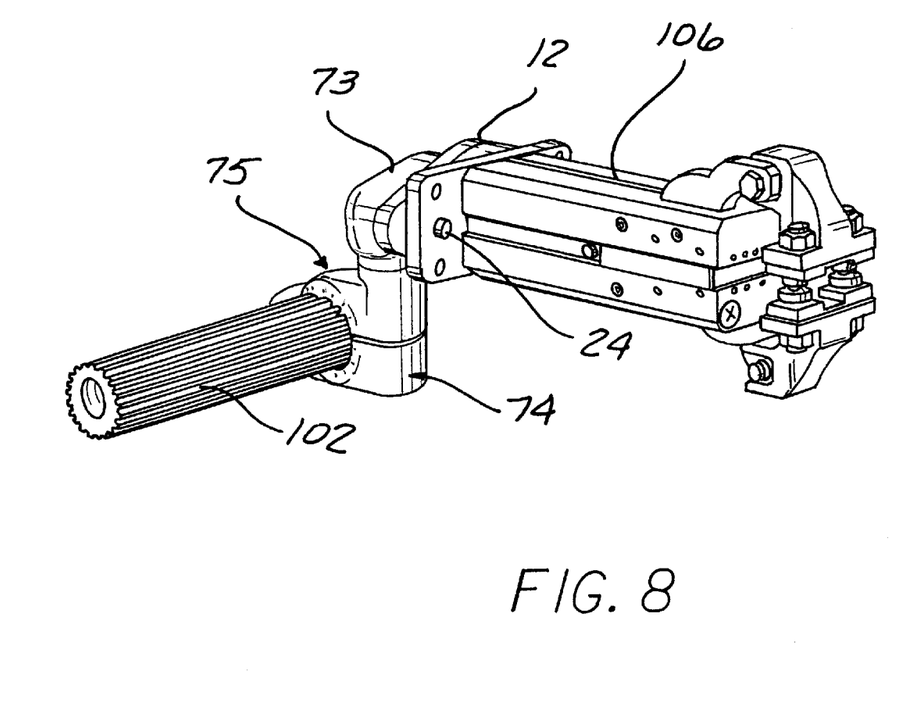
FIG. 8 is a perspective view of a workpiece mounting bracket of the present invention.

To mount a workpiece handling device such as a gripper 106, vacuum cup, or clamp, to the second spline rod 102, the workpiece mounting bracket 75 is connected to the opposite end or second end of the second spline rod 102, as seen in FIG. 8, wherein the first end of the second spline rod 102 is connected to the spline bracket 86, as previously described. The workpiece mounting bracket 75 is substantially similar to the base member 12, midportion 73, and end member 74, as previously described. The end member 74 matingly engages and is adjustably connected to the second end of the second spline rod 102. The base member 12 is connected to the workpiece handling device 106 by fasteners 24.

Figure 9:
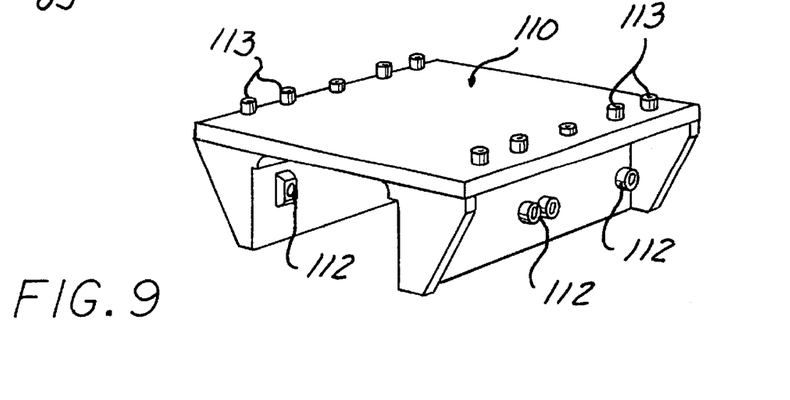
FIG. 9 is a perspective view of a saddle mount used in conjunction with a slide mount of the present invention.

To connect the coupling apparatus 10 to a manipulator or robot (not shown), a saddle mount 110 is shown attached to the slide mount 14, as seen in FIGS. 9–10. The saddle mount 110 is designed to be the main interface between the robot or manipulator. The saddle mount 110 provides a plurality of fasteners 112, 113 for connecting the saddle mount 110 to the base member and for connecting the saddle mount 110 to the manipulator or robot, respectively.

In use, the coupling apparatus 10 may be adjusted along several axes of movement. The entire coupling apparatus 10 may be adjusted along the linear path of travel of the slide mount 14 by loosening the fasteners 24, 44 from the nuts 26, 46, respectively, and sliding the base member 12 along the slide mount 14. The coupling apparatus 10 moves with the base member 12 until the proper location is determined. The fasteners 24, 44 are then threaded into their respective nuts 26, 46 until the base member 12 is secured to the slide mount 14.

In the preferred embodiment, the midportion 16 may be rotatably adjusted with respect to the base member 12 along the first rotational axis 36 by loosening the fastener 44 from the nut 46. The fastener 44 must be loosened far enough to allow the opposing V-shaped teeth 34, 40 of the contoured surfaces 30, 38 respectively, to rotate with respect to one another. Once the desired position of the midportion 16 is determined with respect to the base member 12, the fastener 44 is threaded into the nut 46 until the midportion 16 is secured to the base member 12. Rotational movement of the midportion 16 with respect to the base member 12 is prohibited by maintaining engagement between the V-shaped teeth 34, 40 of the contoured surfaces 30, 38.

The relative positioning of the midportion 73 and base member 12 may be recorded by noting the position of the mark on the base member 12 with the indicia formed on the midportion 73. To adjust the end member 18 relative to the midportion 16, the fastener 54 is loosened from the nut 56 until the V-shaped teeth 49, 51 of the contoured surfaces 48, 50 are allowed to rotate with respect to one another without engaging peaks of the opposing V-shaped teeth 49, 51. Once the desired rotational position of the end member 18 with respect to the midportion 16 is determined, the fastener 54 is threaded into the associated nut 56 until the end member 18 is secured to the midportion 16. Relative rotational movement of the midportion 16 with respect to the end member 18 is prohibited by maintaining engagement between the V-shaped teeth 49, 51 of the contoured surfaces 48, 50.

When a boom rod 20 is used in the preferred embodiment, the boom rod 20 may be removed or changed by unthreading the fastener 54 from the corresponding nut 56 and removing the fastener 54 from aperture 60 provided in the boom rod 20. The boom rod 20 may then be removed and/or replaced with a different boom rod (not shown) wherein the fastener 54 is reinserted through a similar corresponding aperture provided in the replacement boom rod. The fastener 54 is threaded into the associated nut 56 until the boom rod 20 is secure in the end member 18, and the end member 18 is secured to the midportion 16.

In the alternative embodiment, the midportion 73 and the end member 74 are integrally connected, and therefore, the midportion 73 and the end member 74 cannot be adjusted with respect to one another. However, the end member 74 does provide for rotational adjustment of the first spline rod 84 about the second rotational axis 95 by loosening fastener 54 to allow the teeth 85 in the upper portion 76 of the end member 74 to disengage the splines 83 of the first spline rod 84. The spline rod 84 may then be rotated and adjusted by observing where the marked spline 87 on the spline rod 84 is located relative to the indicia 89 on the end member 74. The position of the marked spline 87 may then be recorded to assure the repeatability of the positioning of the coupling apparatus 10.

The spline bracket 86 and the first and second spline rods 84, 102 are adjusted in a similar manner. The fastener 96 in the spline bracket 86 is loosened to allow the first and second spline rods 84, 102 to be rotated relative to the spline bracket 86, and the fastener 96 is tightened to secure the first and second spline rods 84, 102 relative to the spline bracket 86. The positions of the marked splines 87 on the first and second spline rods 84, 102 relative to the indicia 89 on the spline bracket 86 may be recorded to assure the repeatability of the position of the spline rods 84, 102 relative to the spline bracket 86.

Lastly, the workpiece mounting bracket 75 may be adjusted in the same manner as described by the base member 12, midportion 73, and the end member 74 of the alternative embodiment. The end member 74 is connected to the second end of the second spline rod 102, and the base member 12 is connected to the workpiece handling device 106. The position of the workpiece handling device 106 may be rotatably adjusted by rotating the base member 12 with respect to the midportion 73.. The same V-shaped serrated teeth engagement is utilized, as described in the preferred embodiment.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A coupling apparatus for adjustably mounting modular tooling members comprising:

a base member releasably connectable to a slide mount and having a first contoured surface;

a midportion having a second contoured surface that matingly engages and is adjustably connected to said first contoured surface of said base member for rotatably adjusting said midportion about a first axis; and an end member integrally connected to said midportion and having a third contoured surface that matingly engages and is adjustably connected to a first spline rod for rotatably adjusting said spline rod about a second axis.

2. The coupling apparatus stated in claim 1, further comprising:

indicia formed on at least one pair of said base member and said midportion and of said end member and said first spline rod to indicate at least one of the relative positions of said midportion relative to said base member and of said first spline rod relative to said end member.

3. The coupling apparatus stated in claim 1, further comprising:

said first and second contoured surfaces having complementary V-shaped serrated teeth formed therein.

4. The coupling apparatus stated in claim 1, further comprising:

said third contoured surface of said end member having at least one spline tooth formed therein for matingly engaging said first spline rod.

5. The coupling apparatus stated in claim 1, further comprising:

said first spline rod having a first end and a second end wherein said first end is adjustably connected to said end member;

a spline bracket adjustably connected to said second end of said first spline rod for rotatably adjusting said spline bracket relative to said first spline rod about said second axis; and said spline bracket adjustably connected to a second spline rod for rotatably adjusting said second spline rod about a third axis.

6. The coupling apparatus stated in claim 5, further comprising:

said second spline rod having a first end and a second end wherein said first end is adjustably connected to said spline bracket; and a workpiece mounting bracket adjustably connected to said second end of said second spline rod for rotational adjustment of said second spline rod relative to said workpiece mounting bracket about said third axis wherein said workpiece mounting bracket is connectable to a workpiece handling device.

7. A coupling apparatus for adjustably mounting modular tooling members comprising:

a base member releasably connectable and adjustable along a predetermined path of travel of a slide mount, and said base member having a first contoured surface;

a midportion having a second contoured surface that matingly engages and is adjustably connected to said first contoured surface of said base member for rotatably adjusting said midportion about a first rotational axis; and an end member integrally connected to said midportion and having an aperture extending therethrough for receiving a first spline rod, and said end member having at least one spline formed therein and extending into said aperture for matingly engaging said first spline rod wherein said first spline rod may be rotatably adjusted relative to said end member about a second rotational axis.

8. The coupling apparatus stated in claim 7, further comprising:

a position indicator having indicia formed on said midportion and said base member adjacent said first and second contoured surfaces, respectively, to indicate the relative rotational position of said midportion relative to said base member about said first rotational axis.

9. The coupling apparatus stated in claim 7, further comprising:

a position indicator having indicia formed on said end member and said first spline rod to indicate the rotational position of said spline rod relative to said end member about said second rotational axis.

10. The coupling apparatus stated in claim 7, further comprising:

said first and second contoured surfaces having complementary V-shaped serrated teeth formed therein.

11. The coupling apparatus stated in claim 7, further comprising:

said contoured surfaces being substantially circular and having V-shaped teeth extending radially outward.

12. The coupling apparatus stated in claim 7, further comprising:

said first spline rod having a first end and a second end wherein said first end is adjustably connected to said end member;

a spline bracket adjustably connected to said second end of said first spline rod for rotatably adjusting said spline bracket relative to said first spline rod about said second axis; and said spline bracket adjustably connected to a second spline rod for rotational adjustment of said second spline rod about a third axis.

13. The coupling apparatus stated in claim 7, further comprising:

said second spline rod having a first end and a second end wherein said first end is adjustably connected to said spline bracket; and a workpiece mounting bracket adjustably connected to said second end of said second spline rod for rotational adjustment of said second spline rod relative to said workpiece mounting bracket wherein said workpiece mounting bracket is connectable to a workpiece handling device.

14. A coupling apparatus for adjustably mounting modular tooling members comprising:

a base member releasably connectable to a slide mount for adjustable movement along a substantially horizontal axis, and said base member having a plurality of V-shaped serrated teeth formed therein;

a midportion bracket having a plurality of V-shaped serrated teeth formed therein that matingly engage and are adjustably connected to said serrated teeth of said base member for rotatably adjusting said midportion 360° with respect to said base member about a first rotational axis; and an end member integrally connected to said midportion and having an aperture extending therethrough for adjustably receiving a first spline rod, and said end member having at least one spline formed therein and extending into said aperture for matingly engaging and adjustably connecting said first spline rod to said end member wherein said first spline rod may be rotatably adjusted 360° about a second rotational axis.

15. The coupling apparatus as stated in claim 14, further comprising:

a position indicator having indicia formed on said midportion and said base member adjacent said serrated teeth to indicate the relative rotational position of said midportion relative to said base member about said first rotational axis wherein the indicia formed on one of said midportion and said base member indicate angles of rotation in degrees, and the indicia formed on the other of said midportion and said base member provides a marker by which to reference the angles indicated by the other indicia.

16. The coupling apparatus as stated in claim 14, further comprising:

a position indicator having indicia formed on said end member and said first spline rod to indicate the rotational position of said first spline rod relative to said end member about said second rotational axis wherein said indicia formed on said end member provides numerals relating to the angles of rotation of said first spline rod relative to said end member, and said indicia formed on said first spline rod providing a marker formed on an individual spline of said spline rod to reference angles of rotation indicated by said indicia on said end member.

17. The coupling apparatus as stated in claim 14, further comprising:

said V-shaped serrated teeth being substantially circular and extending radially outward from said second rotational axis.

18. The coupling apparatus as stated in claim 14, further comprising:

said first spline rod having a first end and a second end wherein said first end is adjustably connected to said end member;

a spline bracket adjustably connected to said second end of said first spline rod for rotatably adjusting said spline bracket relative to said first spline rod about said second rotational axis; and said spline bracket adjustably connected to a second spline rod for rotational adjustment of said spline bracket relative to said second spline rod about a third rotational axis.

19. The coupling apparatus stated in claim 14, further comprising:

said second spline rod having a first end and a second end wherein said first end is adjustably connected to said spline bracket; and a workpiece mounting bracket adjustably connected to said second end of said second spline rod for rotational adjustment of said second spline rod relative to said workpiece mounting bracket wherein said workpiece mounting bracket is connectable to a workpiece handling device.

20. The coupling apparatus stated in claim 14, further comprising:

said first rotational axis being substantially perpendicular to said second rotational axis.

21. The coupling apparatus stated in claim 14, further comprising:

said first rotational axis being substantially parallel to said second rotational axis.

22. The coupling apparatus stated in claim 19, wherein said workpiece mounting bracket further comprises:

a second end member for matingly engaging and adjustably connecting said second end of said second spline rod to said second end member;

a second midportion integrally connected to said second end member and having a plurality of V-shaped serrated teeth formed therein;

a second base member having a plurality of V-shaped serrated teeth formed therein for matingly engaging and adjustably connecting said second base member to said second midportion; and said second base member releasably connected to said workpiece handling device.

* * * * *